April 30, 1940.   C. O. DAILEY ET AL   2,199,151
SPRAYING MACHINE
Filed June 23, 1937   3 Sheets-Sheet 2
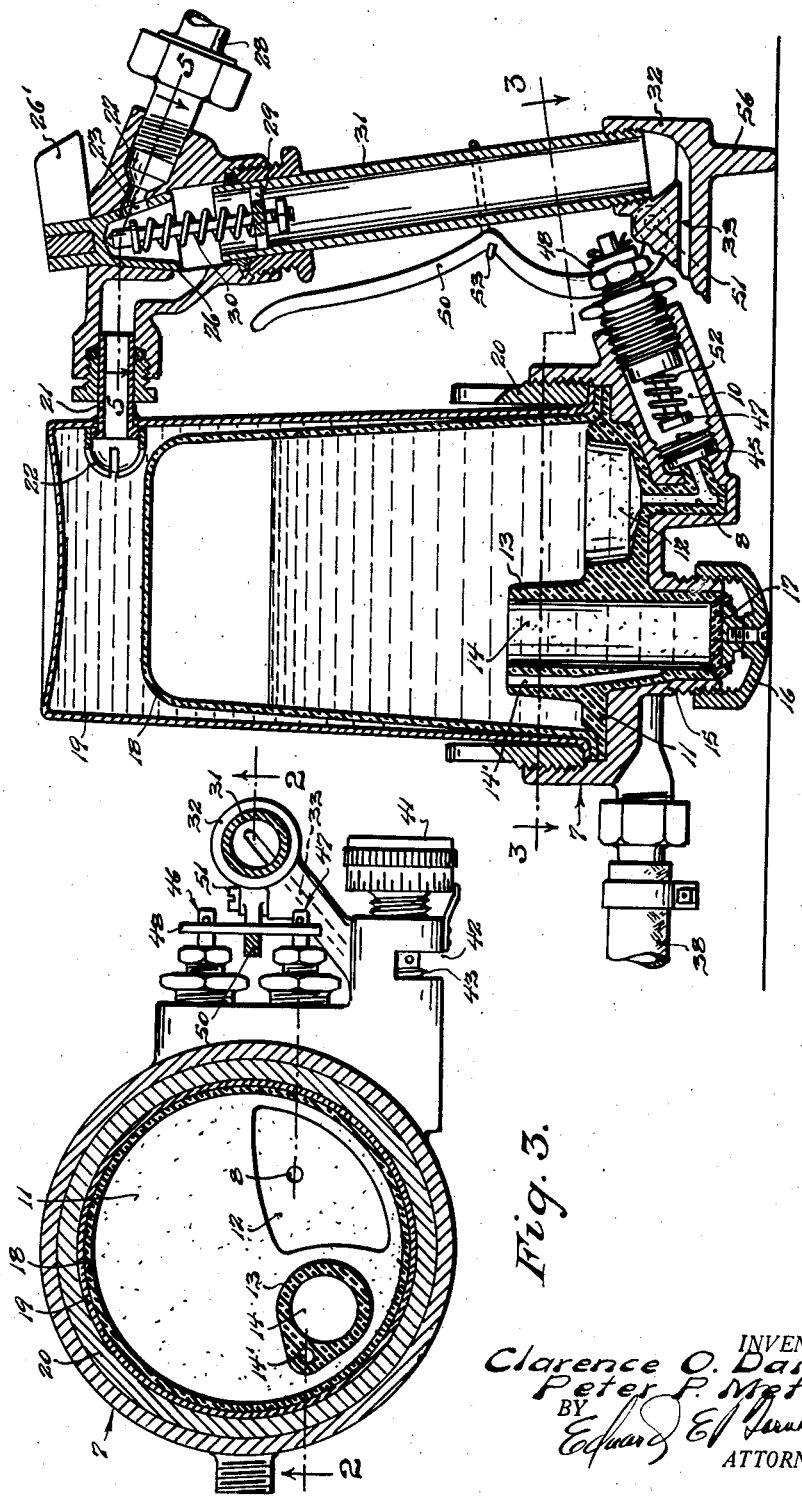
INVENTORS:
Clarence O. Dailey
Peter P. Metz
BY
ATTORNEYS.

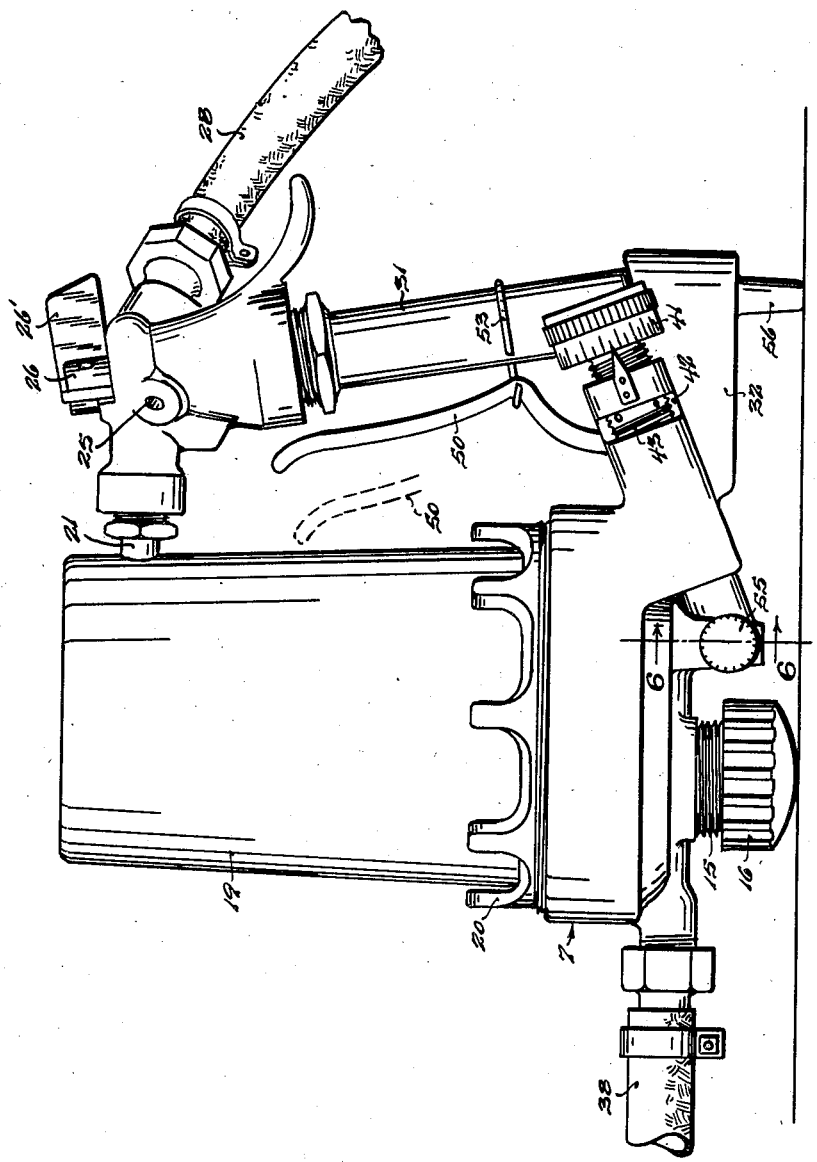

April 30, 1940. C. O. DAILEY ET AL 2,199,151
SPRAYING MACHINE
Filed June 23, 1937 3 Sheets-Sheet 3
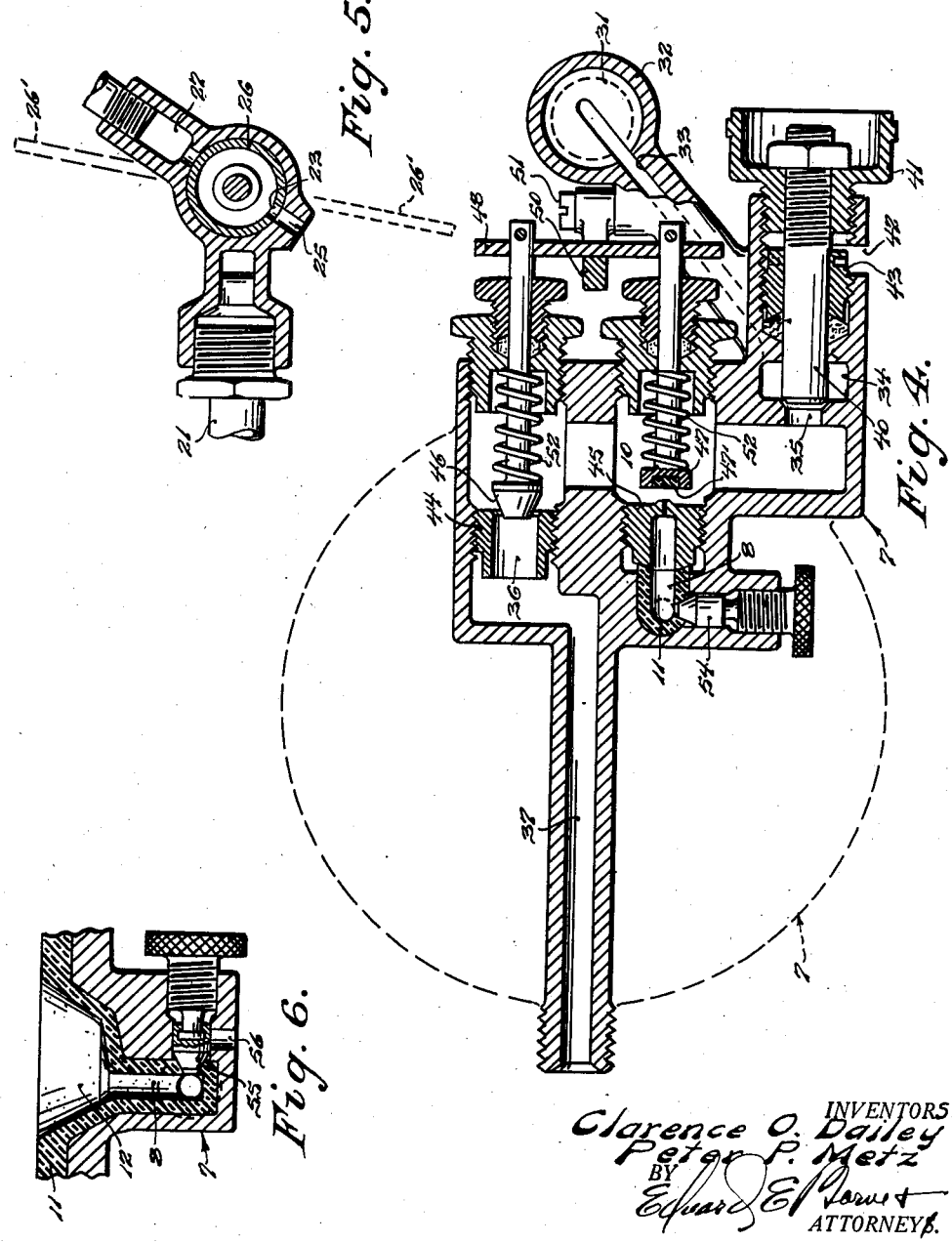
INVENTORS:
Clarence O. Dailey
Peter P. Metz
BY
Edward E. Longer
ATTORNEYS.

Patented Apr. 30, 1940

2,199,151

UNITED STATES PATENT OFFICE 2,199,151

SPRAYING MACHINE

Clarence O. Dailey and Peter P. Metz,
Seattle, Wash.

Application June 23, 1937, Serial No. 149,922

11 Claims. (Cl. 299—85)

Our invention relates to spraying machines and particularly to that character of machine which we illustrate and describe in pending application filed in the United States Patent Office March 14, 1936, Ser. No. 68,816, the general object of the invention being to provide perfected means by which spraying operations may be more rapidly and advantageously performed than has heretofore been possible.

The character of machine to which the present invention is directed is, more especially, one in which a supply of a water-soluble liquid chemical is carried in a compressible sack and delivered in metered quantities therefrom under the pressure influence of a pressure source of water supply into a stream of water flowing from said source and it is a further and particular object of our invention to provide a structural arrangement through the operation of which indication is given to the operator following a depletion of the chemical from the compressible reservoir therefor.

Still further and particular objects of the invention are to provide especially simple and easily operated means for cleaning the feed duct through which the metered flow of chemical is delivered to the stream of diluting water and to provide, for refilling purposes, means permitting the pressure body of water, under the influence of which the chemical is forced into the water stream, to be ejected from the machine without disconnecting the machine from the pressure source of water supply.

The foregoing, together with still further objects and advantages, will become apparent in the course of the following detailed description and the claims thereto annexed, the invention consisting in the new methods of operation by which novel ends are attained and in the novel construction, adaptation, and combination of parts hereinafter described and claimed.

In the drawings:

Figure 1 is a side elevational view illustrating the now preferred embodiment of the invention, full and dotted lines being employed to represent open and closed positions of the operating trigger.

Fig. 2 is a longitudinal vertical section thereof taken on the jogged line 2—2 of Fig. 3.

Fig. 3 is a horizontal section taken on line 3—3 of Fig. 2.

Fig. 4 is a horizontal section to an enlarged scale taken on a somewhat irregular line below the section plane of Fig. 3 to follow the course of the water and chemical from the admission chamber for the former through the mixing chamber to the discharge passage; and Figs. 5 and 6 are enlarged horizontal and transverse vertical detail sections taken on the respective section lines 5—5 of Fig. 2 and 6—6 of Fig. 1.

According to our invention, we provide a head generally indicated by the numeral 7 which, by the act of inverting the machine, lies uppermost during filling periods and lowermost during operating periods, this head being formed as a metal casting and providing a socket-forming cavity bounded by an internally-threaded annular wall and being cored to provide a chemical-discharge duct 8 leading to a mixing chamber 10, hereinafter described. To act as a floor surfacing for the cavity and as a lining for the duct 8 a block 11 of hard rubber or other suitable non-corrodible material is molded into the head and, as illustrated, said rubber body provides a sump 12 leading to the duct 8 and an interior projection 13 which lies as a prolongation of an exterior boss 15, a bore 14 therethrough acting as the filler opening for the machine. The boss, exteriorly threaded, receives a cap 16 which is revolubly fitted with a rubber-surfaced sealing disk 17. 14' denotes an air-relief passage through the projecting pap 13, the object of which is to prevent the development of an air lock at the inner end of the bore 14.

Designated at 18 is the non-porous flexible sack, preferably rubber, which acts as the reservoir for the chemical concentrate, a peripheral flange formed thereon seating in a marginal channel provided by the rubber block 11. A pressure tank 19 encloses the sack and fixedly carries a nipple 21 through which a pressure body of water is supplied to the tank interior, the tank having a flange similar to that of the sack to overlie and compress the latter under the action of a ring-type nut 20 working in the threads of the head wall. Considering the machine in its illustrated operating position, the nipple lies at the upper end of the tank and over its outlet carries a semi-spherical fitting 22 in which are diametrical slots assuring a constant opening as against possibility of the flexible sack choking the nipple outlet.

Associated with the nipple for purposes of draining the pressure tank, the invention provides an exteriorly mounted body member in which are a pair of outlet bores in constant communication, one with another and with a valve chamber, one of said bores receiving the nipple and the other receiving a water pipe lying relatively vertically of the machine and acting to supply the diluting stream of water with which the chemical is mixed. The valve 26 received in said valve chamber is of the rotary type and fits a conical seat, a single port 23 being selectively brought into register with a drain opening 25 or a water-supply passage 27, the latter connecting by a hose 28 with a pressure source of water supply. 26' indicates a control handle for the valve and 30 a spring for maintaining the valve upon its seat, a free stem by which the spring action is transmitted to the valve being axially mounted through a supporting strap 29 seating over the shoulder formed by a counter-bore in the admission end of the water pipe.

Said water pipe, represented by 31, has its lower outlet end threaded in a socket provided in a cored lateral extension 32 of the machine head, the upper end, as with the exposed end of the nipple, being secured in adjusted position relative to the valve-supporting body member by the packing glands of stuffing-box assemblies.

The passage cored in the lateral extension of the machine head is represented by 33 and leads to a water-admission chamber 34 and therefrom through a valved passage 35 to the referred-to mixing chamber 10 which in turn leads through a valved passage 36 to an outlet duct 37 provided with terminal threads for the reception of a discharge hose 38, the hose being fitted preferably with a trigger-controlled spray nozzle. The valve which we employ to regulate the degree of dilution of the chemical is represented at 40 and acts to govern the flow capacity of the passage 35, being comprised of a piston member received through a stuffing box assembly. A valve-control cap 41 peripherally marked with spaced graduations is adjustably secured with respect to the piston. The internally-threaded boss which supports the stuffing-box gland and the valve-regulating cap is formed in the side wall with a vertical slot 42 to permit the gland, indicated at 43, to be taken up without disturbing the necessarily delicate setting of the cap 41, the graduations of which are corelated to the machine following assembly.

Said valved passage 36 which leads from the mixing chamber and the valved opening to the latter communicatively connecting the same with the chemical reservoir are fitted with removable seats, denoted in the respective instances by 44 and 45. The latter of these valve seats, acting to meter the supply of delivered chemical, is formed centrally with a minute orifice. Valves for the valve seats 44 and 45 are represented by 46 and 47 and we link the stems therefor exteriorly of the machine by a yoke 48, the yoke, to obtain collective movement of the valves, being engaged between the valve stems by an operating trigger 50 pivotally supported as at 51. Valve springs 52 oppose the retractive movement of the trigger. A trigger-catch 53 carried by the water pipe 31 secures the trigger in valve-opening position.

Corrosion of the metal of which said valve seats are formed is ordinarily effected only by exposure to concentrated chemicals. Special treating of the valve seat 45 is utilized to resist this action and the related valve 47 we form with an inset block 47' of rubber. While not indicated in the drawings, the passage through the valve seat 44 is of polygonal form with circumferentially spaced sockets being provided in the valve seat 45, tools therefor being designed in accord for removing and inserting the seats.

We find, although employing a strainer, not shown, which is introduced in the filler opening, that the metering orifice of the valve seat 45 occasionally clogs and for the purpose of cleaning the same provide what is termed a clean-out valve 54 which, in open position, connects a blow opening 55 (Fig. 6) with the chemical feed duct 8. In using the clean-out valve, the chemical reservoir is emptied and valves 40, 46, and 47 opened, causing a reverse flow of water through the metering orifice of the valve seat 45 and duct 8 under the pressure influence of the source of water supply.

Posts 56 complement the filling cap as legs for supporting the machine. In the smaller sizes, 24 ounce chemical capacity and under, the operator if desired may carry the machine as a portable unit.

The drain valve, during a filling operation, is disposed to have the port 23 register with the drain opening 25. With the sprayer head uppermost, the filler cap is removed and chemical introduced to the reservoir therefor provided by the sack 18, a predetermined volume of air being trapped above the filling level defined by the lower limits of the filler projection 13. Following replacement of the filler cap and a re-location of the machine in the operating position shown in the several views, the drain valve is given a half-turn whereat port 23 registers with the opening from the water-supply passage 27. The setting given the valve 40 is altered only where it is desired to change the dilution ratio and the pressure stream of water passing the valve 26 flows through water pipe 31 and passage 35 to the mixing chamber 10 simultaneously with a delivery of a pressure body of water through the nipple into the pressure chamber surrounding the chemical sack. To deliver the diluted chemical spray, the operator retracts trigger 50 resulting in a simultaneous opening of the valves 46 and 47 which permits the metered volume of chemical to be forced into the flowing stream under the influence of the pressure differential obtaining between the static sack-compressing pressure and the dynamic pressure of the water stream passing through the mixing chamber. As the chemical is exhausted, the trapped volume of air which in the operating position of the machine lies at the end of the sack remote from the outlet sump 12 is forced through duct 8 into the mixing chamber, spitting as the same is discharged through the spray nozzle. Re-filling is accomplished in the manner described, the trigger being released from the catch 53, the drain valve reversed to its open position, and under the action of the remaining compressed air within the pressure-effected sack as the same expands the static body of water is discharged through the drain opening and the sack snapped into normal shape for re-filling.

So far as we are aware the method by which a volume of air is trapped in the manner described and employed to indicate not only a depletion of the chemical supply but as a medium for expelling the agent used to compress the sack constitutes an entirely new advance in the art. The principles of operation and structural arrangement of parts to obtain this and other desired ends referred to are believed clear from the foregoing description.

We intend that the hereto annexed claims be given a breadth in their interpretation commensurate with the scope of the invention within the art.

What we claim, is:

1. A machine for diluting water-soluble liquid chemicals comprising, in combination with a compressible sack, a pressure tank fitted with a removable head for enclosing said sack and arranged to be inverted to have the head lie uppermost when filling the machine and lowermost when operating the machine, the head of said tank operating in conjunction with the sack to form a reservoir for the chemical and being cored to provide a mixing chamber and having a duct leading thereto through which the chemical is fed from the reservoir, a filling tube also provided in said head having its outlet end projecting into the receptacle whereby, in the filling position of the machine, a volume of air is trapped in the receptacle above the filling limit defined by said inwardly projected end of the filling tube, connection from a pressure source of water supply to the interior of the tank for supplying pressure to the exterior of the sack, connection from said source to the mixing chamber, a valve in said last-named connection for governing the volumetric capacity of the same, a valved outlet from the mixing chamber and a valve for the outlet from the feed duct, and means for operating the valves for each of said outlets simultaneously.

2. A machine for mixing chemicals and water comprising the combination of a compressible receptacle operating as a reservoir for the chemical, a pressure chamber associated with the chemical reservoir, means for connecting said pressure chamber with a pressure source of water supply for compressing the receptacle under the pressure influence of the introduced water, a mixing chamber, means for connecting the mixing chamber with said pressure source of water supply, said mixing chamber having a metering orifice leading thereto from the chemical reservoir and an outlet leading therefrom for delivering the water-mixed chemical, valves for said chemical-feed orifice to the mixing chamber and for the outlet from the mixing chamber, and an operating member common to each of said valves for actuating the same in unison.

3. A machine for mixing chemicals with water comprising the combination of a compressible receptacle operating as a reservoir for the chemical, a pressure chamber associated with the chemical reservoir and arranged for connection with a pressure source of water supply for compressing the reservoir under the static pressure influence of the introduced water, a mixing chamber having a water-admission opening thereto arranged for connection with said pressure source of water supply, a valve for regulating the flow capacity of said admission opening, a valve opening to the mixing chamber leading from the chemical reservoir for supplying chemical to the mixing chamber and a valved opening from the mixing chamber for delivering the water-mixed chemical, and mechanical means common to the valves for each of the last-named openings for operating the same in unison.

4. The structure as defined in claim 3 wherein the stem of the valve for said water-admission opening extends through a stuffing-box assembly including a threaded gland, the threaded bore receiving said gland having a lateral circumferentially-disposed slot permitting a take-up on the gland without disturbing the setting of the valve.

5. In a machine of the character described in which a water-soluble concentrate is ejected from a compressible sack by external pressure applied through a body of water under the influence of a pressure source of water supply, the concentrate being fed into a mixing chamber through which a stream of water is flowing from said source of water supply, a pair of joined connections arranged to lead from said pressure source of supply to the pressure chamber surrounding the sack and to the mixing chamber for obtaining static pressure in the former and dynamic pressure in the latter of said chambers, and means introduced in said connections at the point of juncture thereof comprising a valved member provided with a drain opening to the atmosphere and an admission opening from the source of water supply and operating to obtain communication between both of the connections and either the drain opening or the water-admission opening, selectively.

6. A machine for diluting water-soluble liquid chemicals, the machine being adapted to be inverted from its operating position for filling the same with chemical and comprising the combination of a compressible receptacle acting as a reservoir for the chemical, a pressure chamber associated with the chemical reservoir and arranged for connection with a pressure source of water supply for compressing the reservoir under the pressure influence of said supply source, a filling tube leading to and a feed duct leading from the reservoir which, in the operating position of the machine, lie at the lower end of the reservoir and conversely, in the inverted filling position of the machine, lie at the upper end of the reservoir, and a mixing chamber communicatively connected with the feed duct and having openings to and from opposite ends of the same by which water from said source of water supply is introduced to the mixing chamber and the diluted chemical delivered from the mixing chamber, said filling tube being formed to project its outlet opening a material distance beyond the related end of the reservoir to trap a volume of air in the space within the receptacle lying above said outlet as liquid is poured through the filling tube into the receptacle, said air, by the act of inverting the machine to operate the same, lying at the end of the reservoir remote from the feed duct to obtain an indication of the depletion of the chemical supply as the trapped air is forced through the feed duct and delivered with the flowing stream of water from the mixing chamber under compression pressure upon the reservoir.

7. In a machine operating to dilute liquid chemicals by ejecting the same from a compressible storage receptacle therefor into a pressure stream of a diluting agent by applying a compression pressure to the exterior of the receptacle greater than the pressure obtaining in the diluting stream, the method by which indication is had of the depletion of the chemical supply which consists in trapping a volume of air within the receptacle while filling the same and ejecting the chemical from the lower end of the receptacle whereby the trapped air lying at the opposite upper end of the receptacle acts as a follower for the chemical and is forced under the influence of said applied compression pressure into the stream of the diluting agent only after the liquid chemical has been exhausted from the receptacle.

8. In a machine operating to eject chemical concentrates from a compressible storage sack therefor having a filling duct leading to and a feed duct leading from the interior of the sack, the sack being supported within a pressure chamber and the concentrate ejected therefrom by the static pressure of a body of water under the pressure influence of a pressure source of water supply, the method of ejecting the pressure body of water from the pressure chamber following compression-influenced collapsing of the sack which consists in trapping a volume of air within the sack co-incident with the operation of filling the same with chemical and, following an exhausting of the chemical, performing the steps of isolating the pressure chamber from the pressure source of water supply, and relieving the compression pressure within the chamber by exposing the chamber to the atmosphere to thereby obtain expansion of the sack using the compressed volume of trapped air within the sack as an internal expanding medium.

9. In a machine for expelling chemicals from a compressible flexible sack by the application of compression pressure upon the sack, the combination with said sack and with a sack-enclosing vessel forming a pressure chamber exteriorly of the sack and having an opening to the chamber for admission of the pressure agent, a fitting for said opening to prevent the sack from investing the same comprising a semi-spherical cross-slotted member protruding from the opening into the chamber.

10. In a machine employing a sack-enclosing vessel having an opening thereto, the sack of a flexible material being movable under the influence of pressure into a position overlying the opening, the combination with the vessel and the sack enclosed thereby, of an apertured fitting for said opening to prevent the same from becoming invested by the sack comprising a semi-spherical member protruding from the opening into the interior of the vessel.

11. In a machine for mixing chemicals with water, the chemical being ejected from a compressible receptacle by external pressure applied through a body of water under the influence of a pressure source of water supply and fed into a mixing chamber through which a stream of water is flowing from said source of water supply, connections arranged to lead from said pressure source of supply to the mixing chamber and to the pressure chamber surrounding the chemical receptacle, a vent communicatively connecting both of said chambers with the atmosphere, and a valve for said vent operating in response to a closure thereof to operatively connect the pressure source of water supply with both of the chambers and in response to an opening thereof to isolate the chambers from said source.

PETER P. METZ.
CLARENCE O. DAILEY.